United States Patent

Seltzer et al.

[11] 3,819,576
[45] June 25, 1974

[54] SALTS OF CYANIMINODITHIOCARBONIC ACID WHICH ARE FUNGICIDAL AGENTS

[75] Inventors: Raymond Seltzer, New York, N.Y.; William Considine, Pearl, N.Y.

[73] Assignee: M & T Chemicals Inc., New York, N.Y.

[22] Filed: Jan. 24, 1972

[21] Appl. No.: 220,412

Related U.S. Application Data

[63] Continuation of Ser. No. 784,878, Dec. 18, 1968, abandoned.

[52] U.S. Cl. ... 260/45.75 K, 106/15 AF, 117/138.5, 260/2.5 BB, 424/78, 424/83, 424/288, 424/295, 260/45.75 N
[51] Int. Cl. ... C08f 45/64, C08g 51/64, C08h 17/64
[58] Field of Search ........... 424/288, 295, 294, 293, 424/296, 297, 83; 260/2.5 BB, 45.75 K, 45.75 N, 429.7; 106/15 AF; 117/138.5

[56] References Cited
UNITED STATES PATENTS

| | | | |
|---|---|---|---|
| 2,410,862 | 11/1946 | Bousquet et al. | 424/295 |
| 2,561,208 | 7/1951 | Kirk | 260/429.7 |
| 2,855,418 | 10/1958 | Mugnier | 260/429.7 |
| 2,994,710 | 8/1961 | Morales | 260/429.7 |
| 3,214,453 | 10/1965 | Stern | 424/288 |
| 3,316,284 | 4/1967 | Stamm et al. | 260/45.75 |
| 3,344,019 | 9/1967 | Sowa | 260/45.75 |
| 3,449,388 | 6/1969 | Lewis et al. | 424/295 |

*Primary Examiner*—Donald E. Czaja
*Assistant Examiner*—V. P. Hoke
*Attorney, Agent, or Firm*—Robert P. Auber; Kenneth G. Wheeless; Robert Spector

[57] ABSTRACT

This invention relates to nickel and stannous salts of cyaniminodithio-carbonic acid of the formula

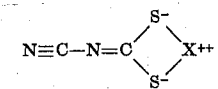

wherein $X^{++}$ is selected from the group consisting of $Ni^{++}$ and $Sn^{++}$; to a method of making said salts, to biological compositions containing said salts as the active agent, and to the use of said salts as biological toxicants.

2 Claims, No Drawings

SALTS OF CYANIMINODITHIOCARBONIC ACID WHICH ARE FUNGICIDAL AGENTS

This application is a streamlined continuation of Ser. No. 784,878, filed Dec. 18, 1968 and now abandoned.

This invention relates to new and useful nickel and tin salts of cyaniminodithiocarbonate, a method of making these salts, biological toxicant compositions and the use of these salts as biological toxicants.

Bacterial growth in aqueous systems has long been a serious problem. Bacteria, including Gram-negative and Gram-positive bacteria, may commonly exist and thrive in aqueous media. Industries which use such media containing bacterial nutrients may be beset by problems of contamination, slime formation, flow-line blockages, spotted and weak paper products, etc. Other areas in which bacterial growth has proved troublesome are secondary oil recovery systems, cooling towers, etc.

Prior art attempts to solve these problems have not been completely satisfactory. Bacterial agents which have sufficient water solubility to produce some inhibitory action have not provided a broad enough spectrum of activity. Other agents typically pentachlorophenol, the mercurials, the quaternaries, may be highly corrosive to machinery and human skin and have excessive mammalian toxicity. They may also be substantially insoluble in water so that their use in aqueous systems is limited and unnecessarily complicated. Moreover, because of their insolubility they may form local deposits which may adversely affect the uniformity of treatment, thereby leaving large proportions of the aqueous system without an adequate level of bacteriostat.

It is an object of this invention to provide a method for controlling bacteria in aqueous systems. It is a further object of this invention to provide a novel class of compounds comprising nickel and stannous salts of cyaniminodithiocarbonic acid. It is a further object of this invention to provide a novel process for producing said nickel and stannous salts of cyaniminodithiocarbonic acid. It is a still further object of this invention to provide novel bacteriostatic and fungistatic compositions. Other objects will be apparent to one skilled in the art upon reading the following disclosure.

Practice of this invention permits the control of a broad spectrum of bacteria including Gram-negative and Gram-positive bacteria. Typical Gram-positive bacteria which may be in control includes *Staphylococcus aureus, Bacillus subtilis*, etc. It is a particular advantage of this invention that the high resistance of Gram-negative bacteria be readily controlled. Typical Gram-negative bacteria includes *Aerobacter aerogenes, Pseudomonas aeruginosa, Escherichia coli*, etc. This invention is not limited to the control of these organisms growing in aqueous systems, but may be used in areas where it is desirable to apply a bacteriostat in conjunction with an aqueous or a solid diluent.

This invention relates to nickel and stannous salts of cyaniminodithiocarbonic acid of the formula

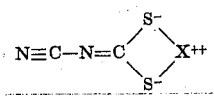

wherein $X^{++}$ is selected from the group consisting of $Ni^{++}$ and $Sn^{++}$.

According to another of its aspects, this invention relates to a method for producing nickel and stannous salts of cyaniminodithiocarbonic acid comprising reacting as reactants a water-soluble salt of cyaniminodithiocarbonic acid and a compound selected from the group consisting of water-soluble nickel salts and water-soluble stannous salts and recovering said cyaniminodithiocarbonate salt.

In accordance with another of its aspects, the method of this invention for protecting a medium susceptible to attack by microorganisms comprises applying to the locus to be protected an effective amount of

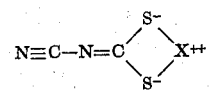

wherein $X^{++}$ is selected from the group consisting of $Ni^{++}$ and $Sn^{++}$.

In general, any water-soluble cyaniminodithiocarbonate salt is operable in reacting with any water-soluble nickel salt or any water-soluble stannous salt. Specific examples of water-soluble cyaniminodithiocarbonate salts include dipotassium cyaniminodithiocarbonate and disodium cyaniminodithiocarbonate. Water-soluble nickel salts include nickel halides such as nickel chloride, nickel bromide, and nickel iodide. Water-soluble stannous salts include stannous halides such as stannous chloride, stannous bromide, and stannous iodide.

In the practice of the process of this invention, the reaction involving a water-soluble cyaniminodithiocarbonate and a water-soluble salt of nickel or stannous tin may be conveniently conducted in water or an organic solvent reaction medium capable of at least partially dissolving the reactants. Typical solvents which may be used include alkanols such as methanol and ethanol; ketones such as acetone or methyl ethyl ketone; and ethers such as dioxane and tetrahydrofuran. The amount of reaction medium used is preferably sufficient to maintain the reaction mixture in a liquid state.

The process may be carried out at ambient temperature. Generally, there is no advantage to carrying out the reaction at a temperature much below 0°C or above about 100°C. A suitable temperature range may be 15°C – 30°C.

The relative proportions of the two reactants used in the process preferably are about the stoichiometric ratio.

The active salts of this invention, as it has been found, effectively and broadly kill fungi or bacteria on various objects or places.

A method of this invention may be effected by using the noted nickel and stannous salts of cyaniminodithiocarbonic acid in solid, liquid, or gaseous (including spray) formulations. It may for example be carried out by applying the salts to the surface of the material to be protected and/or admixing the salts with the material to be protected during the fabrication of said material. The salts may be used per se, particularly when they are incorporated into the material during preparation or fabrication. Many materials, particularly fibrous products such as textiles, may be treated by applying the salt to the surface by dipping, padding, spraying, etc. They may be used in the form of bactericidal composition in which the compound is the active component or one of the active components. Liquid compositions may be utilized in which the compound is dissolved and/or suspended in a solvent. Solid compositions may be utilized in which the compound is mixed with a carrier or diluent. The carrier may be inert, such as talcs, clays, diatomaceous earth, flours, etc., or it may have activity such as that shown by the quaternary ammonium compounds. The liquid formulations of the emulsion type will often include a dispersing agent such as the anionic, cationic, or nonionic surface active agents. To obtain fungicidal and/or bactericidal compositions having an extremely broad spectrum of activity, the salt of cyaniminodithiocarbonic acid may be formulated with other active materials such as the triorganotins, pentachlorophenol, copper-8-quinolinolate, bisphenols, o-phenylphenol, and polybrominated salicylanilides.

The fungicidal and bactericidal preparation may be made up in aqueous or powdered form by mixing the nickel or stannous salts of cyaniminodithiocarbonic acid of the formulae

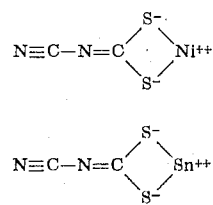

and with inert substances, wetting agents, or adherents, e.g. siliceous chalk, clay dust, kaolin, sulphite cellulose waste liquor, methyl cellulose or the like. They may be used in conjunction with other fungicidal, bactericidal and/or insecticidal substances as dusting, spraying or fumigating preparations.

The active ingredient need not be dissolved in the extending agent but may merely be dispersed or suspended in the extending agent, suspension or emulsion. Also the nickel and stannous salts may first be dissolved in a suitable organic solvent and the organic solution of the active ingredient then incorporated in water or an aqueous extending agent formed in a heterogeneous dispersion. Examples of some suitable organic solvents which were used as extending agents include hexene, benzene, toluene, acetone, cyclohexane, methyl ethyl ketone, isopropanol, butene diol, methanol, diacetone alcohol, xylene, dioxane, isopropyl ether, ethyl dichloride, tetrachloroethane, and suitable petroleum fractions.

Solid extending agents in the form of particulate solids are very useful in the practice of the present invention. In using this type of extending agent, the active ingredient is either adsorbed or dispersed in or on the finely-divided solid material. Preferably these solid extending agents are nonhygroscopic materials which render the composition dry and free flowing. Suitable solid extending agents include the natural clays, such as kaolin, the China clays, the bentonites, attapulgites. Other minerals in natural state may also be used, e.g. talc, quartz, diatomaceous earth, Fuller's earth, and such chemically modified minerals as acid washed bentonite, precipitated calcium phosphate, precipitated calcium carbonate, calcium magnesium and colloidal silica. The novel compounds of this invention may also be applied as aerosol sprays, for example those containing acetone, methyl ethyl ketone, and cyclohexanone as solvents with methyl chloride or Freon as a propellant.

It is a particular feature of this invention that the nickel and stannous salts of cyaniminodithiocarbonic acid may be used to control a wide range of microorganisms including bacteria and fungi. The compounds of this invention are highly effective against a wide spectrum of bacteria including Gram-negative and Gram-positive bacteria. Typical Gram-positive bacteria against which the technique of this invention may be particularly effective may include *Staphylococcus aureus*. Typical Gram--negative bacteria which may be controlled in accordance with certain aspects of this invention may include *Aerobacter aerogenes* and *Pseudomonas aeruginosa*. It is a particular feature of this invention that in accordance with certain aspects it may be used to control *Candida albicans*, *A. flavus*, and *P. funiculosum*.

In the practice of this invention, these microorganisms and preferably bacteria may be controlled in a wide variety of loci. It is possible according to this invention to treat plastics, textiles, paper products, paints, and other specific materials which may serve as media in which microorganisms may grow. Plastics, textiles, paper products, and paints are illustrative of the materials which are rendered resistant to attack when treated by applying the nickel and stannous salts of cyaniminodithiocarbonic acid to the surface and/or by incorporation therein. The plastics in massive and in fiber form may include urethanes, halogenated polymers and copolymers such as polyvinyl chloride and polyvinyl chloride-acetate copolymers, polyesters, polyamides, polyolefins, and natural rubbers, synthetic rubbers, etc. Natural fiber products that may be protected include paper products, hemp, and felts. Paints may be protected "in the can" and also after application. Typical paints may include interior and exterior vinyl latex and alkyd paints, non-synthetic flat natural paints, the acrylics, and the vinyl, and anti-fouling paints such as the acrylic and the vinyl varieties thereof. The cyaniminodithiocarbonates are also useful in preserving adhesives; in secondary oil recovery processes; in paper mill slime control processes; and in methods of controlling *Staphylococcus aureus* in hospitals. They are a useful and active component of detergent sanitizers and are used for this and other purposes in the form of an aerosol material. They are also used to protect plants and other growth against microorganism (including fungi) attack. The use of the novel bactericides of this invention to render plastics, especially polyvinyl chloride, resistant to attack by microorganisms and the novel resistant compositions produced thereby represent one of several embodiments of this invention.

It will be apparent to those skilled in the art that the contained amount of the active salts present in the total composition may be sufficient to provide an effective amount at the locus to be protected against the appropriate microorganism. Typically such contained amounts may range from very low concentrations typically 0.001 percent – 0.002 percent up to 90 percent – 100 percent. These concentrations will permit attainment on the medium susceptible to attack at the locus to be protected, of effective amounts which may for example be, in water treatment, of 1–100 ppm or in plastic treatment, 50–2000 ppm, etc.

It is a particular feature of certain compositions prepared in accordance with this invention that they retain their unexpectedly high level of bactericidal activity under adverse conditions. These compositions are particularly characterized by their high activity in the presence of a wide variety of surface active agents, e.g. soaps, dispersants, detergents, etc. It is particularly unexpected that this activity may be retained in the presence of anionic soaps such as sodium stearate, e.g. Ivory soap.

The salts of this invention are active against a great variety of parasitical and saprophytical fungi yeasts and bacteria. The salts, furthermore, are relatively non-toxic against warm-blooded animals and they have also a very remarkable non-toxicity on green plants. The salts, furthermore, may be used as seed dressing agents, agents for soil treatment, for the conservation of banana fruit stems, and also for the preservation of leather and synthetic resins against attack by fungi and bacteria.

In the Broth Dilution Test results, the tests reported showed high activity of the salts against noted microorganisms. In each example, a series of tests were carried out when the compound was placed within a nutrient broth in amount of 500, 250, 125, 63, 31, 16, 8, 4, and 2 parts per million (ppm). Each broth was inoculated with the test organism and the broth incubated at 37°C for two days. The organism growth was visually observed.

The process of this invention is exemplified in the examples which follow, which is understood to be illustrative and not a restrictive embodiment of the invention.

EXAMPLE 1

Preparation of stannous cyaniminodithiocarbonate.

A solution of 22.6 grams (0.1 mole) of stannous chloride was formed in 100 milliliters of tetrahydrofuran. To the foregoing solution 19.4 grams (0.1 mole) of dipotassium cyaniminodithiocarbonate in 50 milliliters of water was added. An orange solid precipitated, and thereafter was filtered, washed with water, and dried for 10 hours. The product exhibited a weight of 25.5 grams, a yield of 89 percent of the theoretical.

EXAMPLE 2

23.8 grams (0.1 mole) of nickel chloride hexahydrate was dissolved in 50 milliliters of water and added to a solution of 19.4 grams (0.1 mole) of dipotassium cyaniminodithiocarbonate in 25 milliliters of water. A dark brown precipitate was formed which was filtered, washed, and dried. The product exhibited a weight of 11.0 grams, 48 percent of the theoretical yield.

Although this invention has been illustrated by reference to specific examples, numerous changes and modifications thereof which clearly fall within the scope of the invention will be apparent to those skilled in the art.

What is claimed is:

1. A novel plastic composition resistant to the growth thereon of microorganisms which comprises said plastic and between 50 and 2000 parts per million, based on the weight of said plastic, of a salt of the formula

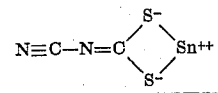

2. A method for protecting plastics from attack by microorganisms, said method comprising either applying to the surface of said plastic or incorporating into the interior structure of a body formed from said plastic between 50 and 200 parts per million, based on the weight of said plastic, of a salt of the formula

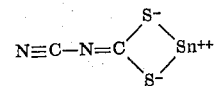

* * * * *